US012566504B2

(12) United States Patent
Liu et al.

(10) Patent No.: US 12,566,504 B2
(45) Date of Patent: Mar. 3, 2026

(54) TACTILE FEEDBACK APPARATUS AND DRIVING METHOD THEREFOR, AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Xiaotong Liu, Beijing (CN); Yingzi Wang, Beijing (CN); Yuju Chen, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 66 days.

(21) Appl. No.: 18/686,940

(22) PCT Filed: Oct. 18, 2021

(86) PCT No.: PCT/CN2021/124313
§ 371 (c)(1),
(2) Date: Feb. 27, 2024

(87) PCT Pub. No.: WO2023/065061
PCT Pub. Date: Apr. 27, 2023

(65) Prior Publication Data
US 2024/0370090 A1 Nov. 7, 2024

(51) Int. Cl.
*G06F 3/01* (2006.01)

(52) U.S. Cl.
CPC ..................................... *G06F 3/016* (2013.01)

(58) Field of Classification Search
CPC ...................................................... G06F 3/016
See application file for complete search history.

(56) References Cited

U.S. PATENT DOCUMENTS

2006/0119573 A1* 6/2006 Grant ...................... G06F 3/016
345/156
2008/0024459 A1 1/2008 Poupyrev et al.
(Continued)

FOREIGN PATENT DOCUMENTS

| CN | 105739762 A | 7/2016 |
| CN | 111488790 A | 8/2020 |
| CN | 112799500 A | 5/2021 |

OTHER PUBLICATIONS

International Search Report of PCT/CN2021/124313 dated Jul. 20, 2022 with English translation, (7p).

*Primary Examiner* — Patrick N Edouard
*Assistant Examiner* — Joseph P Fox
(74) *Attorney, Agent, or Firm* — Arch & Lake LLP

(57) ABSTRACT

A tactile feedback apparatus includes a tactile feedback substrate and a controller. The tactile feedback substrate includes a base substrate, a first electrode layer, a piezoelectric layer, and a second electrode layer that are laminated sequentially. A plurality of electrode pairs arranged sequentially along a row direction are formed in a portion where the first electrode layer and the second electrode layer overlap with each other. The controller is configured to be capable of determining one driving mode from a plurality of driving modes as a target driving mode. In any of the driving modes, the electrode pairs are combined to form a plurality of driving units adjoined in sequence along the row direction. The number of the electrode pairs in each driving unit is different in different driving modes. The controller is further configured to drive one or more of the driving units of the target driving mode.

9 Claims, 6 Drawing Sheets

(56)        References Cited

U.S. PATENT DOCUMENTS

| | | |
|---|---|---|
| 2012/0306790 A1 | 12/2012 | Kyung et al. |
| 2016/0018893 A1 | 1/2016 | Choi et al. |
| 2018/0052550 A1 | 2/2018 | Zhang et al. |
| 2018/0130319 A1* | 5/2018 | Khoshkava ......... H04M 1/0266 |
| 2020/0125815 A1* | 4/2020 | Lu .......................... H10K 59/40 |
| 2020/0241722 A1 | 7/2020 | Kim et al. |
| 2020/0257364 A1 | 8/2020 | Strandberg |
| 2021/0240327 A1 | 8/2021 | Kim et al. |

* cited by examiner determining one driving mode from the plurality of driving modes as the target driving mode ⌇~S110 driving one or more of the driving units of the target driving mode, where driving any of the driving units includes loading a same driving signal to each of the electrode pairs of the driving unit ⌇~S120

FIG. 13

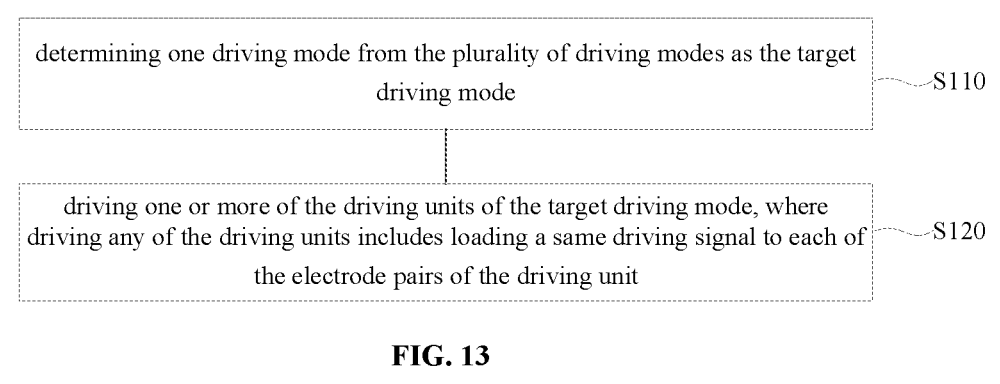

TACTILE FEEDBACK APPARATUS AND DRIVING METHOD THEREFOR, AND ELECTRONIC DEVICE

CROSS-REFERENCE TO RELATED APPLICATION

The present application is the U.S. National Stage of International Application No. PCT/CN2021/124313, filed on Oct. 18, 2021, the contents of which are incorporated herein by reference in their entireties for all purposes.

TECHNICAL FIELD

The present disclosure relates to the field of tactile feedback technology, and specifically to a tactile feedback apparatus and a driving method therefor, and an electronic device.

BACKGROUND

A tactile feedback apparatus can achieve tactile reproduction based on a squeeze-film effect, improving a tactile experience of an electronic device. In prior arts, the tactile feedback apparatus can only achieve the maximum amplitude in a specific vibration mode, while the amplitude of other vibration modes is relatively small, then the adjustment of the tactile experience is limited.

It should be illustrated that the information disclosed in the background section above is only used for enhancing the understanding of the background of the present disclosure, and thus may include information that does not constitute prior art known to those ordinary skilled in the art.

SUMMARY

An object of the present disclosure is to overcome the deficiencies of the prior art described above, provide a tactile feedback apparatus and a driving method therefor, and an electronic device, and improve the amplitude of the tactile feedback apparatus in a plurality of different vibration modes.

According to a first aspect of the present disclosure, a tactile feedback apparatus is provided. The tactile feedback apparatus includes a tactile feedback substrate and a controller.

The tactile feedback substrate includes a base substrate, a first electrode layer, a piezoelectric layer, and a second electrode layer that are laminated sequentially. A plurality of electrode pairs arranged sequentially along a row direction are formed in a portion where the first electrode layer and the second electrode layer overlap with each other. The electrode pair extends along a column direction.

The controller is configured to be capable of determining one driving mode from a plurality of driving modes as a target driving mode. In any of the driving modes, the electrode pairs are combined to form a plurality of driving units adjoined in sequence along the row direction. Each of the driving units includes a same number of electrode pairs adjoined in sequence. The number of the electrode pairs in the driving unit is different in different driving modes.

The controller is further configured to drive one or more of the driving units of the target driving mode.

According to an embodiment of the present disclosure, one of the first electrode layer or the second electrode layer is provided with a plurality of strip-shaped electrodes arranged sequentially along the row direction, and another one of the first electrode layer or the second electrode layer is provided with a common electrode overlapping with the strip-shaped electrodes.

Any of the strip-shaped electrodes forms one of the electrode pairs with the common electrode.

According to an embodiment of the present disclosure, the strip-shaped electrode includes a plurality of strip-shaped sub-electrodes arranged sequentially along the column direction, and each of the strip-shaped sub-electrodes is electrically connected to the controller independently.

According to an embodiment of the present disclosure, the first electrode layer includes a plurality of first strip-shaped electrodes arranged sequentially along the row direction.

The second electrode layer includes a plurality of second strip-shaped electrodes arranged sequentially along the row direction and in one-to-one correspondence with the first strip-shaped electrodes.

The first strip-shaped electrode and a corresponding second strip-shaped electrode overlap with each other.

The first strip-shaped electrode and the corresponding second strip-shaped electrode form the electrode pair.

According to an embodiment of the present disclosure, an orthographic projection of the first strip-shaped electrode on the piezoelectric layer coincides with an orthographic projection of the corresponding second strip-shaped electrode on the piezoelectric layer.

According to an embodiment of the present disclosure, the first strip-shaped electrode includes a plurality of strip-shaped sub-electrodes arranged sequentially along the column direction, and each of the strip-shaped sub-electrodes is electrically connected to the controller independently; and/or the second strip-shaped electrode includes a plurality of strip-shaped sub-electrodes arranged sequentially along the column direction, and each of the strip-shaped sub-electrodes is electrically connected to the controller independently.

According to a second aspect of the present disclosure, an electronic device is provided. The electronic device includes the tactile feedback apparatus described above.

According to a third aspect of the present disclosure, a driving method of a tactile feedback apparatus is provided. The driving method of the tactile feedback apparatus is used for driving the tactile feedback apparatus described above. The driving method of the tactile feedback apparatus includes determining one driving mode from the plurality of driving modes as the target driving mode, and driving one or more of the driving units of the target driving mode. Driving any of the driving units includes loading a same driving signal to each of the electrode pairs of the driving unit.

According to an embodiment of the present disclosure, the driving one or more of the driving units of the target driving mode includes loading a first driving signal to each of the electrode pairs of an even-numbered driving unit, and loading a second driving signal to each of the electrode pairs of an odd-numbered driving unit. The first driving signal is an inverted signal of the second driving signal.

According to an embodiment of the present disclosure, the first electrode layer includes a plurality of first strip-shaped electrodes arranged sequentially along the row direction. The second electrode layer includes a plurality of second strip-shaped electrodes arranged sequentially along the row direction and in one-to-one correspondence with the first strip-shaped electrodes. The first strip-shaped electrode and a corresponding second strip-shaped electrode overlap with each other. The first strip-shaped electrode and the corresponding second strip-shaped electrode form the electrode pair.

The loading the first driving signal to each of the electrode pairs of the even-numbered driving unit includes: loading a first driving voltage signal to each of the first strip-shaped electrodes in the even-numbered driving unit, and loading a second driving voltage signal to each of the second strip-shaped electrodes in the even-numbered driving unit.

The loading the second driving signal to each of the electrode pairs of the odd-numbered driving unit includes loading the second driving voltage signal to each of the first strip-shaped electrodes in the odd-numbered driving unit, and loading the first driving voltage signal to each of the second strip-shaped electrodes in the odd-numbered driving unit.

According to an embodiment of the present disclosure, the driving one or more of the driving units of the target driving mode includes loading the driving signal to each of the electrode pairs of an even-numbered driving unit, or loading the driving signal to each of the electrode pairs of an odd-numbered driving unit.

According to an embodiment of the present disclosure, one of the first electrode layer or the second electrode layer is provided with a plurality of strip-shaped electrodes arranged sequentially along the row direction, another one of the first electrode layer or the second electrode layer is provided with a common electrode overlapping with the strip-shaped electrodes, and any of the strip-shaped electrodes forms one of the electrode pairs with the common electrode.

The loading the driving signal to each of the electrode pairs of the even-numbered driving unit includes loading a common voltage signal to the common electrode, and loading a driving voltage signal to each of the strip-shaped electrodes of the even-numbered driving unit.

The loading the driving signal to each of the electrode pairs of the odd-numbered driving unit includes loading a common voltage signal to the common electrode, and loading a driving voltage signal to each of the strip-shaped electrodes of the odd-numbered driving unit.

It should be understood that the above general description and the later detailed description are exemplary and explanatory only and do not limit the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principles of the present disclosure. Obviously, the accompanying drawings in the following description are only some of the embodiments of the present disclosure, and other accompanying drawings may be obtained from these drawings by those ordinary skilled in the art without creative labor.

FIG. 13 is a schematic flowchart of a driving method of a tactile feedback apparatus in an embodiment of the present disclosure.

DETAILED DESCRIPTION

Figure 1:
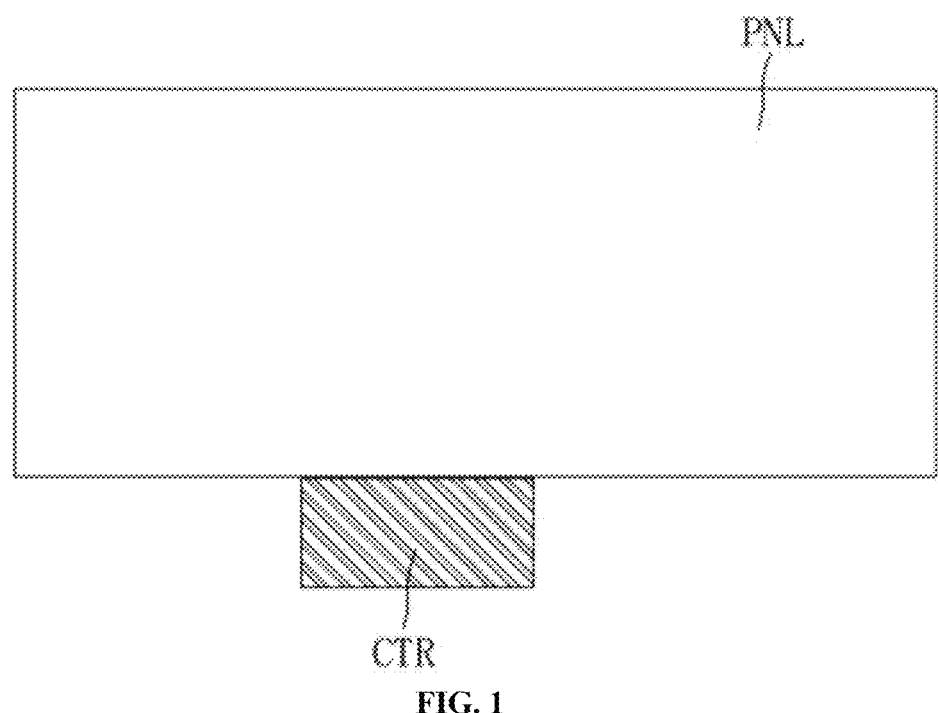
FIG. 1 is a schematic structural diagram of a tactile feedback apparatus in an embodiment of the present disclosure.

Example embodiments are now described more comprehensively with reference to the accompanying drawings. However, the example embodiments are capable of being implemented in a variety of forms and should not be construed as being limited to the embodiments set forth herein. Rather, the provision of these embodiments allows the present disclosure to be comprehensive and complete and conveys the idea of the example embodiments comprehensively to those skilled in the art. The same reference numerals in the drawings indicate the same or similar structures, therefore their detailed descriptions will be omitted. In addition, the accompanying drawings are only illustrative illustrations of the present disclosure and are not necessarily drawn to scale.

Although relative terms such as "up" and "down" are used in this specification to describe a relative relationship between one component and another component indicated in the drawings, these terms are only used for convenience in this specification, for example, according to the direction of the examples described in the drawings. It can be understood that if the device indicated in the drawings is flipped upside down, the component described as "up" may become the component described as "down". When a certain structure is on "top" of another structure, it may mean that a structure is formed integrally on another structure, or that a structure is "directly" set on another structure, or that a structure is "indirectly" set on another structure through yet another structure.

The terms "a", "an", "this", "the", and "at least one" are used for indicating a presence of one or more elements/components/etc. The terms "include" and "have" are used for indicating open inclusion and meaning that there may be additional elements/components/etc. in addition to the listed elements/components/etc. The terms "first", "second", "third", etc. are used only as markers and are not intended to be quantitative limitations of the objects to which they refer.

A tactile feedback substrate typically needs to be capable of achieving a number of different vibration modes to provide different tactile experiences. Different vibration modes have different requirements for the width of the electrodes on the tactile feedback substrate. In the related arts, the tactile feedback substrate typically uses one of the vibration modes as a base vibration mode, and sets the electrodes according to an optimal manner of the base vibration mode. The tactile feedback substrate utilizes the electrodes provided thereon to achieve other vibration modes than the base vibration mode. However, the electrodes provided on the tactile feedback substrate do not match the requirements for the electrodes of other vibration modes, which can result in a very small vibration amplitude of the tactile feedback substrate when implementing other vibration modes. This reduces the richness of the tactile experience and constrains the tactile experience of the user.

The present disclosure may provide a tactile feedback apparatus and a driving method thereof. Referring to FIG. 1, the tactile feedback apparatus includes a tactile feedback substrate PNL and a controller CTR that cooperate with each other.

Figures 3, 4:
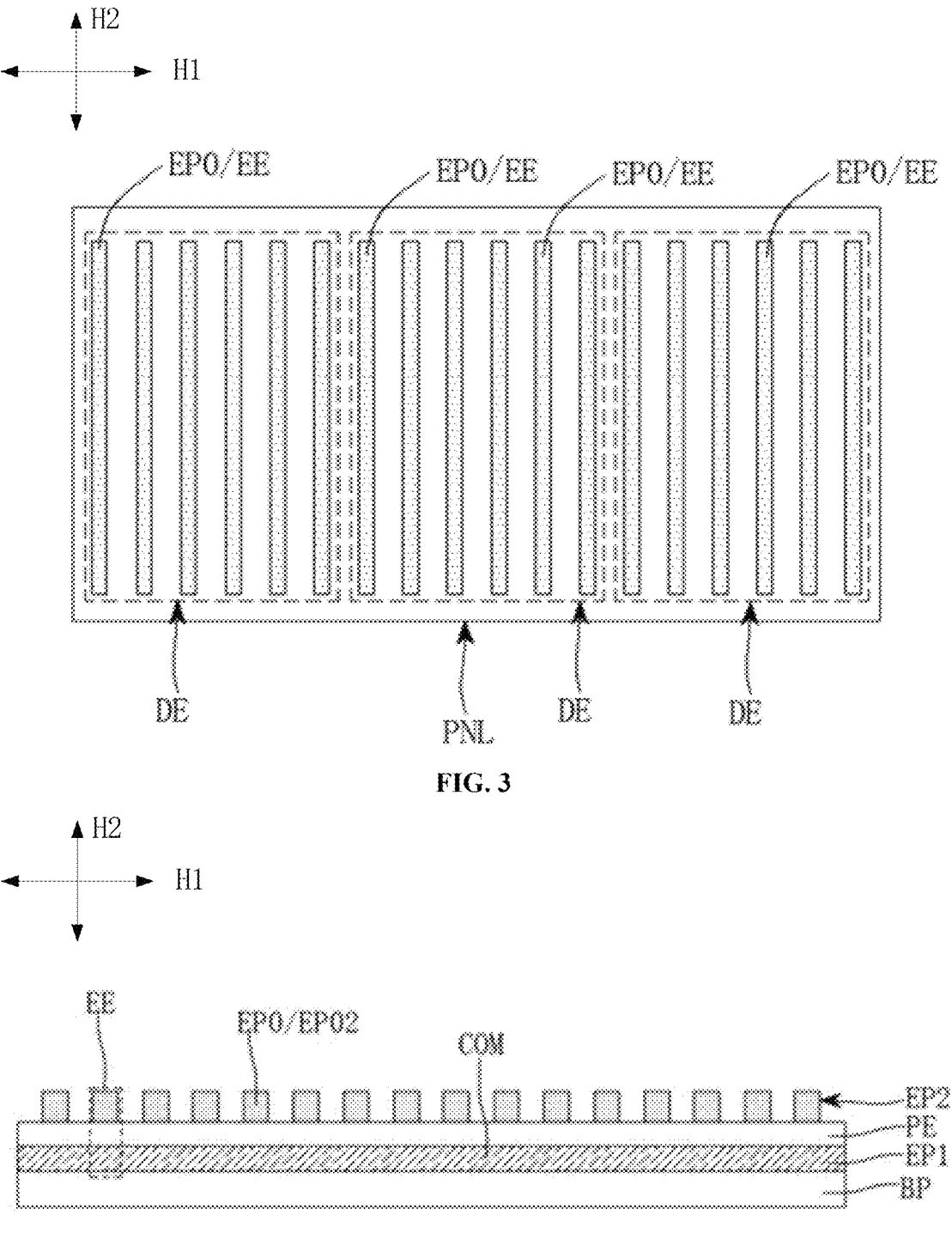
FIG. 3 is a schematic structural diagram of electrode pairs forming a plurality of driving units in a driving mode in an embodiment of the present disclosure.
FIG. 4 is a schematic diagram of a cross-sectional structure of a tactile feedback substrate in an embodiment of the present disclosure.
Figure 5:
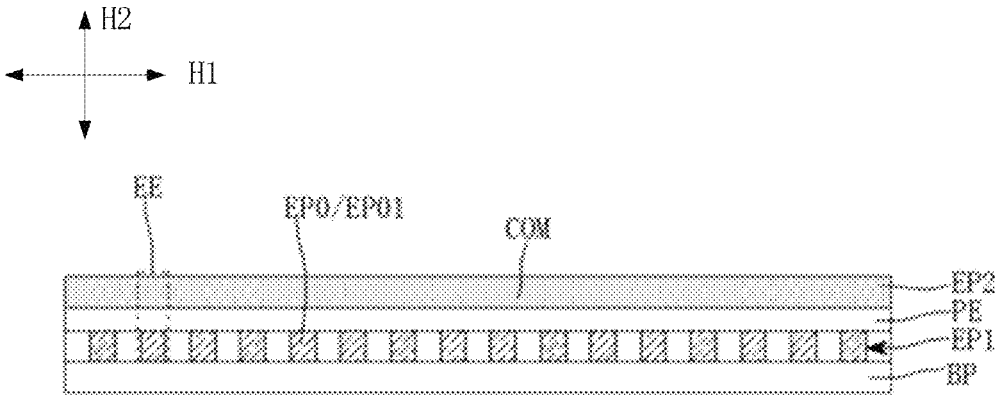
FIG. 5 is a schematic diagram of a cross-sectional structure of a tactile feedback substrate in an embodiment of the present disclosure.
Figure 6:
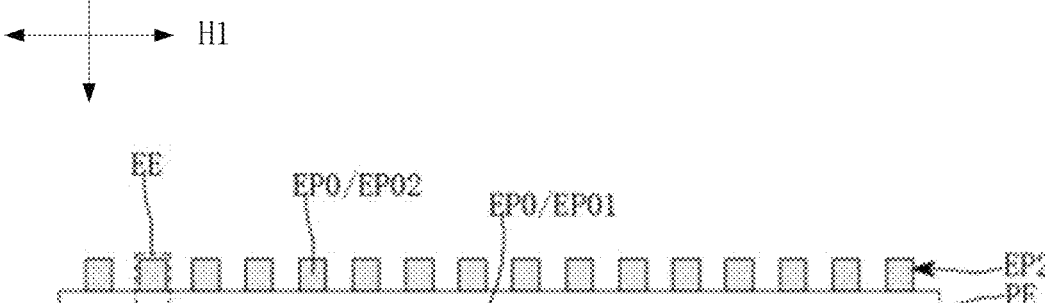
FIG. 6 is a schematic diagram of a cross-sectional structure of a tactile feedback substrate in an embodiment of the present disclosure.

In the present disclosure, referring to FIGS. 4 to 6, the tactile feedback substrate PNL includes a base substrate BP, a first electrode layer EP1, a piezoelectric layer PE, and a second electrode layer EP2 that are laminated sequentially. A plurality of electrode pairs EE arranged sequentially along a row direction H1 are formed in a portion where the first electrode layer EP1 and the second electrode layer EP2 overlap with each other. When AC voltage is loaded between the first electrode layer EP1 and the second electrode layer EP2, the piezoelectric layer PE may undergo a periodic deformation, and then transmits the vibration to the base substrate BP.

In the present disclosure, the controller CTR is configured to be capable of determining one driving mode from a plurality of driving modes as a target driving mode. In any of the driving modes, referring to FIG. 3 and FIGS. 7 to 9, the electrode pairs EE are combined to form a plurality of driving units DE adjoined in sequence along the row direction H1, each of the driving units DE includes a same number of electrode pairs EE adjoined in sequence. The number of the electrode pairs EE in the driving unit DE is different in different driving modes.

The controller CTR is further configured to drive one or more of the driving units DE of the target driving mode. In this way, each of the electrode pairs EE in the driven driving units DE may be driven by the controller CTR to cause the piezoelectric layer PE to drive, in response to the electric field between the electrode pairs EE, the tactile feedback substrate PNL to vibrate, thereby forming the tactile sense.

Figure 7:
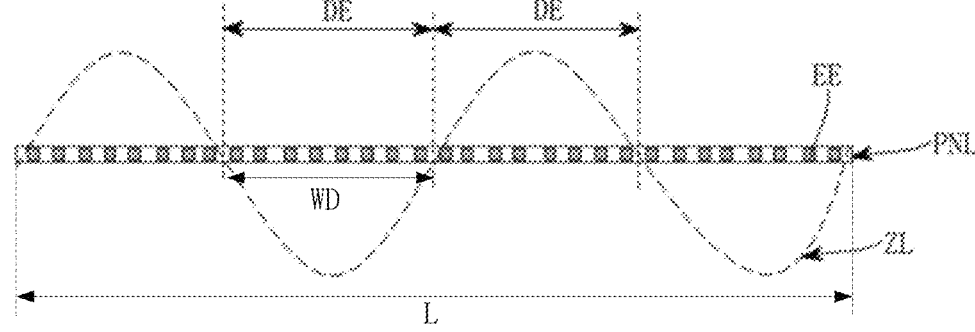
FIG. 7 is a schematic structural diagram of a driving unit corresponding to one type of vibration mode of a tactile feedback substrate in an embodiment of the present disclosure.
Figures 8, 9, 10:
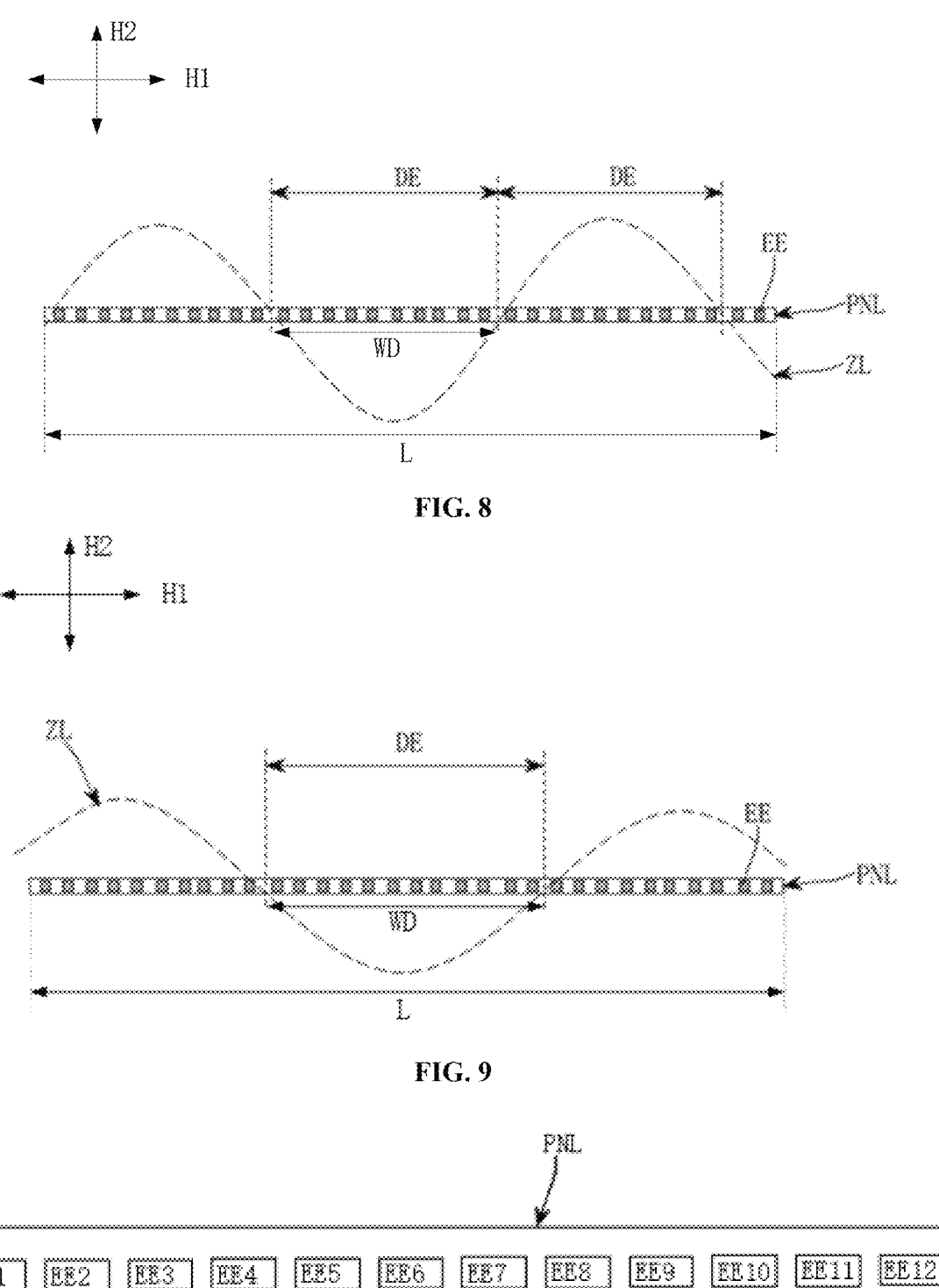
FIG. 8 is a schematic structural diagram of a driving unit corresponding to one type of vibration mode of a tactile feedback substrate in an embodiment of the present disclosure.
FIG. 9 is a schematic structural diagram of a driving unit corresponding to one type of vibration mode of a tactile feedback substrate in an embodiment of the present disclosure.
FIG. 10 is a schematic diagram of a cross-sectional structure of electrode pairs of a tactile feedback substrate in an embodiment of the present disclosure.

The tactile feedback apparatus provided in the present disclosure is capable of determining the target driving mode based on the vibration mode that the tactile feedback substrate PNL is required to achieve. In the target driving mode, the controller CTR may drive a driving unit DE as a whole, so that the width of the driving unit DE matches the vibration mode of the tactile feedback substrate PNL, and thus the tactile feedback substrate PNL obtains the maximum amplitude in that vibration mode. Referring to FIGS. 7 to 9, when the vibration mode to be achieved by the tactile feedback substrate PNL is changed, the controller CTR may change the driving mode, and thereby change the driven driving unit DE, such that the width of the changed driving unit DE matches the changed vibration mode. In this way, the tactile feedback apparatus of the present disclosure can change the width of the driving unit DE according to the vibration mode that the tactile feedback substrate PNL is required to achieve, and then the amplitude of the tactile feedback substrate PNL is enabled to be enhanced in different vibration modes, and can improve the range of adjustment of the amplitude, resulting in a more delicate tactile sensation.

In the following, the structure, principle and effect of the tactile feedback apparatus provided in the present disclosure are further explained and illustrated in conjunction with the accompanying drawings.

Figure 2:
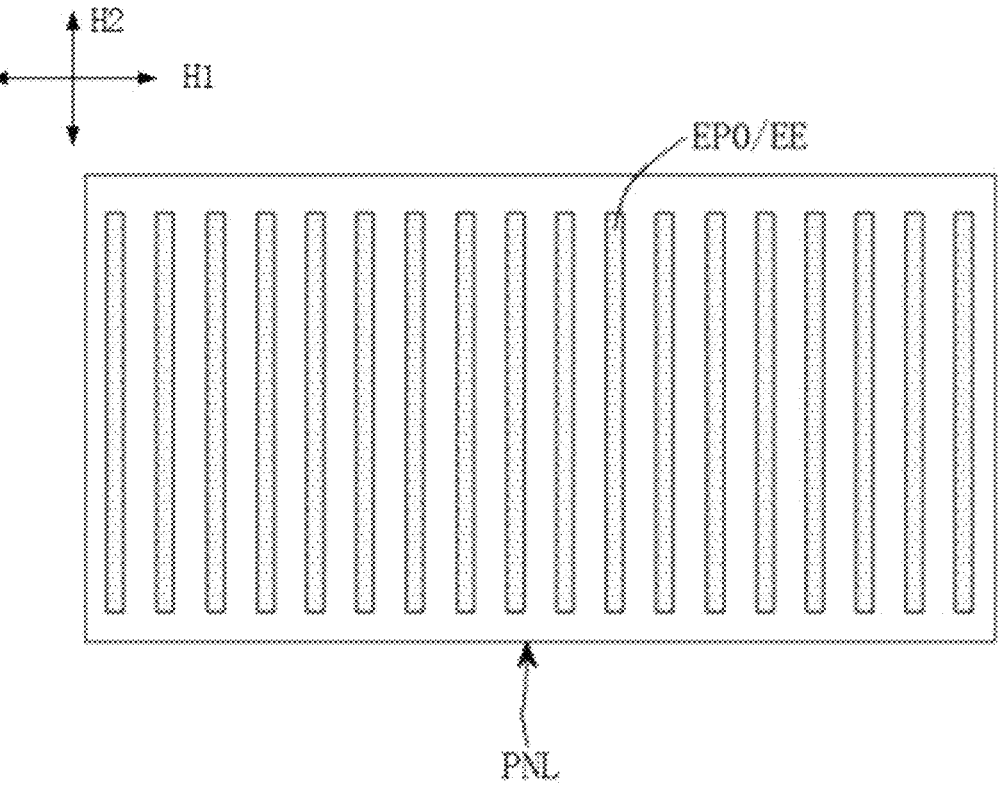
FIG. 2 is a schematic structural diagram of electrode pairs of a tactile feedback substrate in an embodiment of the present disclosure.

In an embodiment of the present disclosure, referring to FIG. 2, the tactile feedback substrate PNL may be provided with a plurality of electrode pairs EE, and the electrode pair EE may extend along a column direction H2 to form a strip-shaped distribution as a whole. The electrode pairs EE may be arranged sequentially along the row direction H1. In an embodiment of the present disclosure, the electrode pairs EE may be arranged sequentially in equal spacings along the row direction H1.

In the present disclosure, the row direction H1 and the column direction H2 are two directions parallel to the plane of the tactile feedback substrate PNL and perpendicular to each other. In an embodiment of the present disclosure, the base substrate BP may be rectangular, one of the row direction H1 or the column direction H2 is parallel to the direction of the long side of the base substrate BP, and the other one of the row direction H1 or the column direction H2 is parallel to the direction of the short side of the base substrate BP. By way of example, the row direction H1 is parallel to the direction of the long side of the base substrate BP, and the column direction H2 is parallel to the direction of the short side of the base substrate BP.

In an embodiment of the present disclosure, the tactile feedback substrate PNL is further provided with a binding pad and a driving wire. The electrodes in the first electrode layer and the second electrode layer are connected to the binding pad via the driving wire. The binding pad is used for electrically connecting to the controller. In this way, the controller is electrically connected to the electrodes in the first electrode layer and the second electrode layer so as to load the driving signal to the electrode pairs EE.

In the present disclosure, the tactile feedback substrate PNL is designed for achieving a plurality of different vibration modes, such as achieving a plurality of preset vibration modes or achieving respective ones of vibration modes within a range of vibration modes. Respective ones of vibration modes that the tactile feedback substrate PNL is capable of achieving may be defined as a set of vibration modes of the tactile feedback substrate PNL. When driving the tactile feedback substrate PNL each time, the vibration mode to be achieved by the tactile feedback substrate PNL is defined as the target vibration mode. It can be understood that each of the vibration modes has a requirement for the width of the electrodes. In the present disclosure, the electrode that best matches one of the vibration modes may be defined as the reference electrode corresponding to that vibration mode. When the tactile feedback substrate PNL arranges the electrodes in accordance with the reference electrode of one vibration mode, the tactile feedback substrate PNL can achieve the maximum amplitude in that vibration mode, and thus a superior tactile experience and a wider tactile adjustment amplitude for that vibration mode can be achieved. In the present disclosure, the reference electrode that best matches the target vibration mode is defined as the target reference electrode. When the electrode of the tactile feedback substrate PNL is the target reference electrode, the tactile feedback substrate PNL may enable the amplitude of the target vibration mode to be maximized.

The tactile feedback substrate PNL of the present disclosure may have a plurality of reference frequencies and a reference size corresponding to each reference frequency. The reference frequency is a frequency of a voltage that can cause the vibration frequency of the piezoelectric layer PE to be an intrinsic frequency of the tactile feedback substrate PNL. When the frequency of the driving signal that drives the electrode pair EE is a reference frequency, the vibration frequency of the piezoelectric layer PE is an intrinsic frequency (e.g., a first-order intrinsic frequency) of the tactile feedback substrate PNL, which can cause the tactile feedback substrate PNL to vibrate at the intrinsic frequency to produce a resonance. Half of the wavelength of the transverse wave conducted by the resonance is a reference size corresponding to that reference frequency. In other words, the reference size is half the wavelength of the transverse wave conducted by the tactile feedback substrate PNL when the tactile feedback substrate PNL vibrates at one of its intrinsic frequencies.

In some embodiments of the present disclosure, different vibration modes of the tactile feedback substrate PNL may correspond to different reference frequencies, i.e., one vibration mode represents the vibration of the tactile feedback substrate PNL at one reference frequency. A width of the reference electrode corresponding to one vibration mode may be equal to a reference size corresponding to the reference frequency which corresponds to that vibration mode.

In some embodiments of the present disclosure, the controller CTR may provide a corresponding driving mode for each of the vibration modes in the set of vibration modes. When the controller CTR drives the tactile feedback substrate PNL in accordance with one driving mode, the tactile feedback substrate PNL may achieve the vibration mode corresponding to that driving mode. In the present disclosure, the driving modes that the controller CTR is capable of providing can be defined as a set of driving modes of that controller CTR.

In an embodiment of the present disclosure, the controller CTR may select a driving mode corresponding to the target vibration mode from the set of driving modes as the target driving mode. When the controller CTR drives the tactile feedback substrate PNL in accordance with the target driving mode, the tactile feedback substrate PNL can achieve the target vibration mode and maximize the amplitude.

In the present disclosure, the electrode pair EE may be made to have a small width (size in the row direction). In this way, referring to FIG. 3, a plurality of adjacent electrode pairs EE may be combined to form a driving unit DE, and a reference electrode is simulated by using the driving unit DE. In FIGS. 7 to 9, the surface topography of the tactile feedback substrate PNL in different vibration modes is illustrated with the dashed line ZL. Referring to FIGS. 7 to 9, in different vibration modes, the tactile feedback substrate PNL has different vibration topography, and the opening size of the tactile feedback substrate PNL during vibration is different; accordingly, the requirements for the width of the electrodes are different in different vibration modes. In the present disclosure, when the tactile feedback substrate PNL needs to change the vibration mode, the controller CTR may readjust the number of electrode pairs EE in the driving unit DE to make the width of the driving unit DE match the vibration mode of the tactile feedback substrate PNL, and thus make the tactile feedback substrate PNL capable of reaching the maximum amplitude in all these vibration modes. In other words, the number of electrode pairs EE in the driving unit DE is different in different driving modes, which enables that the reference electrode simulated by the driving unit DE is different in different driving modes. When the width of the reference electrode corresponding to the target vibration mode of the tactile feedback substrate PNL is small, the number of electrode pairs EE included in the driving unit DE in the target driving mode is also small. When the width of the reference electrode corresponding to the target vibration mode of the tactile feedback substrate PNL is large, the number of electrode pairs EE included in the driving unit DE in the target driving mode is also large.

Figure 11:
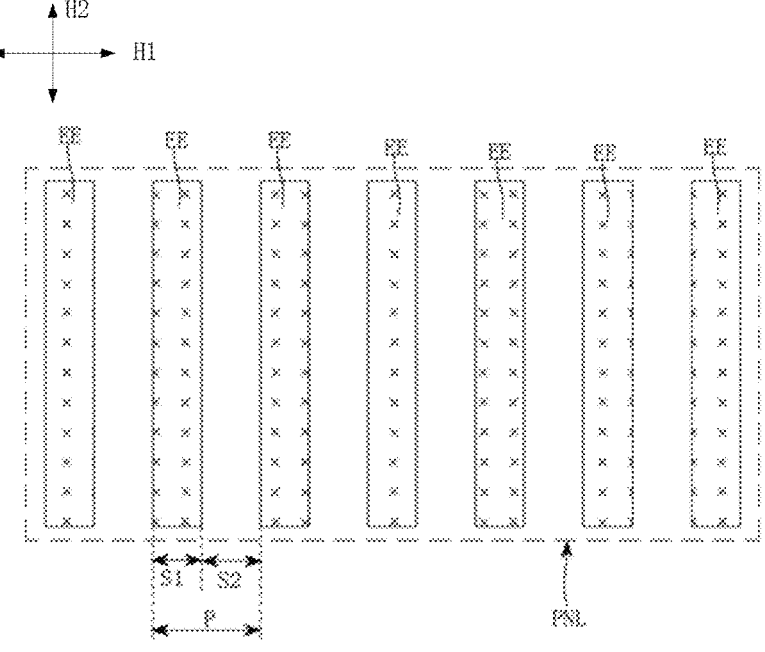
FIG. 11 is a schematic diagram of a local structure of an arrangement of electrode pairs in an embodiment of the present disclosure.

In the present disclosure, referring to FIG. 11, the width (size in the row direction H1) of the electrode pair EE is S1, the spacing between adjacent electrode pairs EE is S2, and the set pitch of the electrode pairs EE is P. Then the set pitch P of the electrode pairs EE satisfies: set pitch P=width S1 of the electrode pair EE+spacing S2 between adjacent electrode pairs EE. In some embodiments of the present disclosure, the width WD of the driving unit DE may be made to be WD=nP, where n is the number of electrode pairs EE in the driving unit DE and is a positive integer, and P is the set pitch of the electrode pairs EE. It can be understood that the number of electrode pairs EE in the driving unit DE is different (i.e., n is different) in different driving modes. In some embodiments, the set pitch of the electrode pairs EE may be small, e.g. not greater than 2 mm, and in particular may be between 0.5 and 1.5 mm. This may allow the electrode pairs EE to be more flexible in combining to form different driving units DE, which allows the PNL to be capable of obtaining the maximum amplitude in a greater number of vibration modes. It can be understood that the set pitch of the electrode pairs EE in the present disclosure may also be within other ranges, and may be selected and confirmed according to the vibration modes that the tactile feedback substrate PNL is required to achieve, whichever is able to satisfy the individual vibration modes that the tactile feedback substrate PNL is required to achieve.

In an embodiment of the present disclosure, referring to FIGS. 7 to 9, the width of the driving unit DE of the target driving mode may be equal to or substantially equal to the width of the target reference electrode. In other words, in order to maximize the amplitude of the tactile feedback substrate PNL in the target vibration mode, the tactile feedback substrate PNL needs to be driven by using the target reference electrode; the controller CTR may use the driving mode corresponding to the target vibration mode as the target driving mode, the driving unit DE of the target driving mode is the target driving unit, and the width of the target driving unit is equal to the width of the target reference electrode. In this way, the target driving unit can be used to simulate the target reference electrode, which then allows the tactile feedback substrate PNL to maximize the target vibration mode.

The tactile feedback substrate PNL may vibrate during operation, and the vibration causes peaks and valleys to form on the surface of the array substrate. These peaks and valleys may serve as nodes of the tactile feedback substrate. The number A of nodes formed by the tactile feedback substrate PNL is fixed in one driving mode and is substantially equal to the number of driving units that can formed by combining in that driving mode. The smaller the number of electrode pairs included in each driving unit, the smaller the width of that driving unit, and the greater the number of nodes that can be formed by the tactile feedback substrate PNL in that driving mode. In some embodiments, the length L of the tactile feedback substrate PNL may be reasonably adjusted so that L is substantially equal to an integer multiple of the width WD of the driving unit DE in each driving mode. In an embodiment of the present disclosure, $L=m*WD$, where m is a positive integer: in different driving modes, the value of WD is different and the value of m is different. In other embodiments, $L=m*WD+x$, where m is a positive integer, and x is an adjustable size: herein, in different driving modes, the value of WD is different, the value of m is different, and x may or may not be the same. Further, in the same driving mode, x is greater than 0 and not greater than half of WD.

In an embodiment of the present disclosure, the width WD of the driving unit DE is not greater than 15 mm in each driving mode. In this way, a squeeze-film effect can be effectively formed between the tactile feedback substrate PNL and the finger of the user, thereby ensuring that the user has a good tactile experience. In an embodiment of the present disclosure, when the controller CTR is driven in accordance with the target driving mode, not only can the width of the target driving unit be made equal to the width of the target reference electrode, but also the frequency of the driving signal loaded to the target driving unit can be made equal to the reference frequency corresponding to the target vibration mode, for example, loading an AC signal with a frequency of the reference frequency to each of the electrode pairs EE in the driving unit DE.

By way of example, in an embodiment of the present disclosure, the tactile feedback substrate PNL is designed to be capable of achieving three different vibration modes such as a first vibration mode, a second vibration mode, and a third vibration mode. On the tactile feedback substrate PNL, the first electrode layer EP1 and the second electrode layer EP2 form a plurality of electrode pairs EE arranged sequentially in equal spacings along the row direction H1, the width of each electrode pair EE is S1, and the spacing between adjacent electrode pairs EE is S2, then the set pitch P of the electrode pairs EE is S1+S2.

The controller CTR is configured to select a driving mode as the target driving mode from a first driving mode corresponding to the first vibration mode, a second driving mode corresponding to the second vibration mode, and a third driving mode corresponding to the third vibration mode.

In the first driving mode, the driving unit DE is a first driving unit, and the first driving unit includes n1 electrode pairs EE adjoined in sequence; then a width of the first driving unit DE satisfies: $n1*P=n1*(S1+S2)$, where n1 is a positive integer. In the first driving mode, the frequency of the voltage loaded to the driving unit DE by the controller CTR may be equal to the reference frequency corresponding to the first vibration mode.

In the second driving mode, the driving unit DE is a second driving unit, and the second driving unit includes n2 electrode pairs EE adjoined in sequence; then a width of the second driving unit DE satisfies: $n2*P=n2*(S1+S2)$, where n2 is a positive integer. In the second driving mode, the frequency of the voltage loaded to the driving unit DE by the controller CTR may be equal to the reference frequency corresponding to the second vibration mode.

In the third driving mode, the driving unit DE is a third driving unit, and the third driving unit includes n3 electrode pairs EE adjoined in sequence; then a width of the third driving unit DE satisfies: $n3*P=n3*(S1+S2)$, where n3 is a positive integer. In the third driving mode, the frequency of the voltage loaded to the driving unit DE by the controller CTR may be equal to the reference frequency corresponding to the third vibration mode. Herein, n1, n2, and n3 are not the same.

It can be understood that in other embodiments of the present disclosure, the tactile feedback substrate PNL may be designed to be capable of achieving more different vibrational modes, then the controller CTR may accordingly set the driving mode corresponding to each of the vibrational modes so that each of the vibrational modes is capable of achieving the maximum amplitude.

FIG. 10 shows only 12 adjacent electrode pairs EE among the numerous electrode pairs EE of the tactile feedback substrate PNL, labelled electrode pair EE1~electrode pair EE12, respectively. As follows, the structure and principle of the tactile feedback apparatus of the present disclosure are further explained and illustrated by taking the driving units to which the 12 electrode pairs EE are attributed in different driving modes as an example.

In this example, when the opening size of the target vibration mode to be achieved by the tactile feedback substrate PNL is 2P (P=S1+S2), each driving unit DE in the target driving mode determined by the controller CTR includes two electrode pairs EE. For example, the electrode pair EE1 and the electrode pair EE2 may be combined to form one driving unit DE, the electrode pair EE3 and the electrode pair EE4 may be combined to form one driving unit DE, and so on, the electrode pair EE11 and electrode pair EE12 may be combined to form one driving unit DE.

When the opening size of the target vibration mode to be achieved by the tactile feedback substrate PNL is 3P (P=S1+ S2), each driving unit DE in the target driving mode determined by the controller CTR includes three electrode pairs EE. For example, the electrode pair EE1, the electrode pair EE2 and the electrode pair EE3 may be combined to form one driving unit DE; the electrode pair EE4, the electrode pair EE5 and the electrode pair EE6 may be combined to form one driving unit DE; the electrode pair EE7, the electrode pair EE8 and the electrode pair EE9 may be combined to form one driving unit DE; and the electrode pair EE10, the electrode pair EE11 and the electrode pair EE12 may be combined to form one driving unit DE.

When the opening size of the target vibration mode to be achieved by the tactile feedback substrate PNL is 4P (P=S1+ S2), each driving unit DE in the target driving mode determined by the controller CTR includes four electrode pairs EE. For example, the electrode pair EE1, the electrode pair EE2, the electrode pair EE3, and the electrode pair EE4 may be combined to form one driving unit DE; the electrode pair EE5, the electrode pair EE6, the electrode pair EE7, and the electrode pair EE8 may be combined to form one driving unit DE; and the electrode pair EE9, the electrode pair EE10, the electrode pair EE11, and the electrode pair EE12 may be combined to form one driving unit DE.

In an embodiment of the present disclosure, a plurality of driving modes may be preset in the controller CTR, for example, a set of driving modes may be built-in. The controller CTR may receive a mode selection signal from an external circuit (e.g., a microprocessor of an electronic device) and select based on the mode selection signal one of the plurality of driving modes as the target driving mode.

In another embodiment, the controller CTR may be preset with a mode algorithm, and configured to be capable of determining the vibration mode information based on the mode selection signal from the external circuit, and then calculate the target driving mode based on the vibration mode information. In this way, the controller CTR can calculate different driving modes based on different vibration mode information, and thus, it is equivalent to determining one driving mode as the target driving mode from the plurality of driving modes based on the vibration mode information.

Optionally, the vibration mode information is information related to the vibration mode to be achieved by the tactile feedback substrate PNL, for example, the vibration mode information may include one or more of a width of the reference electrode required to achieve the vibration mode, a frequency of the driving signal required to achieve the vibration mode, and the like. Of course, in some embodiments, the above-mentioned width of the reference electrode, the frequency of the driving signal, and the like may also be encoded, and a corresponding mapping table may be set in the controller CTR. In the present disclosure, such information that enables the controller CTR to directly or indirectly obtain the width of the reference electrode required for the target vibration mode are all vibration mode information in the present disclosure.

In the present disclosure, referring to FIG. 13, the tactile feedback apparatus may be driven according to the driving method shown in steps S110 to S120.

At step S110, one driving mode is determined from the plurality of driving modes as the target driving mode.

At step S120, one or more of the driving units DE of the target driving mode is driven. Driving any of the driving units DE includes loading a same driving signal to each of the electrode pairs EE of the driving unit DE.

In the present disclosure, the controller CTR, when driving the tactile feedback substrate PNL, may drive part of the driving units DE, or may drive each of the driving units DE. When two adjacent driving units DE are driven, the driving signals loaded to the two adjacent driving units DE may be different, and in particular may be of mutually inverted driving signals.

By way of example, in an embodiment of the present disclosure, the step S120 may include loading a first driving signal to each of the electrode pairs EE of an even-numbered driving unit DE, and loading a second driving signal to each of the electrode pairs EE of an odd-numbered driving unit DE. The first driving signal is an inverted signal of the second driving signal. In this embodiment, each of the driving units DE may be driven so that the vibration mode of the tactile feedback substrate PNL has a large amplitude.

By way of further example, in another embodiment of the present disclosure, the step S120 may include loading the driving signal to each of the electrode pairs EE of an even-numbered driving unit DE, or loading the driving signal to each of the electrode pairs EE of an odd-numbered driving unit DE. In this embodiment, only the even-numbered driving unit DE or the odd-numbered driving unit DE is driven, i.e. only half of the driving units are driven. In the present disclosure, these driven driving units DE may be defined as working driving units; the controller CTR may only drive the working driving units and may not drive the other driving units. In other embodiments of the present disclosure, in addition to determining the working driving unit by the odd-even positions in which the driving units DE are located, the working driving unit may be determined in other ways, such as by selecting one of every three driving units DE as the working driving unit, or by selecting one of every three driving units DE as the working driving unit, and the present disclosure does not limit these ways.

In some embodiments, referring to FIGS. 4 and 5, one of the first electrode layer EP1 or the second electrode layer EP2 is provided with a plurality of strip-shaped electrodes EP0 arranged sequentially along the row direction H1, another one of the first electrode layer EP1 or the second electrode layer EP2 is provided with a common electrode COM overlapping with the strip-shaped electrodes EP0, and any of the strip-shaped electrodes EP0 forms one of the electrode pairs EE with the common electrode COM.

By way of example, referring to FIG. 5, the first electrode layer EP1 includes a plurality of first strip-shaped electrodes EP01 (as the strip-shaped electrodes EP0) arranged sequentially along the row direction H1; and the second electrode layer EP2 is provided with the common electrode COM overlapping with the first strip-shaped electrodes EP01. The first strip-shaped electrode EP01 and the common electrode COM form the electrode pair EE.

By way of further example, referring to FIG. 4, the second electrode layer EP2 includes a plurality of second strip-shaped electrodes EP02 (as the strip-shaped electrodes EP0) arranged sequentially along the row direction H1; and the first electrode layer EP1 is provided with the common electrode COM overlapping with the second strip-shaped electrodes EP02. The second strip-shaped electrode EP02 and the common electrode COM form the electrode pair EE.

In an embodiment of the present disclosure, when the tactile feedback substrate PNL is driven, the driving signal may be loaded to each of the electrode pairs EE of the even-numbered driving unit DE, or the driving signal may be loaded to each of the electrode pairs EE of the odd-numbered driving unit DE. The driving signal may include a driving voltage signal and a common voltage signal; the driving voltage signal may be loaded to the strip-shaped electrode EP0 of the working driving unit, and the common voltage signal may be loaded to the common electrode COM. In an embodiment of the present disclosure, the driving voltage signal may be an alternating voltage signal or a pulsed voltage signal, and the common voltage signal is a constant voltage signal. Of course, in other embodiments of the present disclosure, the driving voltage signal may also be a constant voltage signal, and the common voltage signal may be an alternating voltage signal or a pulsed voltage signal.

In this way, when the tactile feedback substrate PNL is provided with the common electrode COM, the controller CTR may load the common voltage signal to the common electrode COM when driving the tactile feedback substrate PNL, which results in that the voltage of the common electrode COM of each electrode pair EE is the same. Accordingly, the controller CTR may, in each driving mode, determine only the strip-shaped electrode EP0 of each electrode pair EE in the driving unit DE. In other words, in any of the driving modes, the controller CTR may, based on each of the strip-shaped electrodes EP0, determine the driving unit DE to which the strip-shaped electrode EP0 belongs, and thus load a corresponding driving voltage signal to the strip-shaped electrode EP0.

In another embodiment of the present disclosure, the controller CTR may drive each of the electrode pairs EE at the same time when driving the tactile feedback substrate PNL, i.e., two different driving signals are used to achieve the driving the electrode pairs EE. The controller CTR may load three different voltages to the electrode pairs EE, i.e., a common voltage signal loaded to the common electrode COM, a first driving voltage signal loaded to each of the strip-shaped electrodes EP0 of the even-numbered driving unit DE, and a second driving voltage signal loaded to each of the strip-shaped electrodes EP0 of the odd-numbered driving unit DE. Herein, the first driving voltage signal and the second driving voltage signal may be mutually inverted signals. In this manner, in the even-numbered driving unit DE, the first driving voltage signal and the common voltage signal constitute one set of driving signals; and in the odd-numbered driving unit DE, the second driving voltage signal and the common voltage signal constitute another set of driving signals. Further, the first driving voltage signal and the second driving voltage signal may be alternating voltage signals or pulsed voltage signals, and the common voltage signal is a constant voltage signal.

In some embodiments of the present disclosure, the first electrode layer EP1 includes a plurality of first strip-shaped electrodes EP01 arranged sequentially along the row direction H1. The second electrode layer EP2 includes a plurality of second strip-shaped electrodes EP02 arranged sequentially along the row direction H1 and in one-to-one correspondence with the first strip-shaped electrodes EP01. The first strip-shaped electrode EP01 and a corresponding second strip-shaped electrode EP02 overlap with each other. The first strip-shaped electrode EP01 and the corresponding second strip-shaped electrode EP02 form the electrode pair EE. In other words, the electrode pair EE of the present disclosure may be an electrode pair, and the electrode pair includes the first strip-shaped electrode EP01 and the second strip-shaped electrode EP02 that overlap with each other.

In an embodiment of the present disclosure, an orthographic projection of the first strip-shaped electrode EP01 on the piezoelectric layer PE coincides exactly with an orthographic projection of the second strip-shaped electrode EP02 on the piezoelectric layer PE.

In an embodiment of the present disclosure, the controller CTR may drive each of the driving units DE and cause the electric fields formed by two adjacent driving units DE to be in opposite directions. For example, in the step S120, a first driving voltage signal may be loaded to each of the first strip-shaped electrodes EP01 in the even-numbered driving unit DE, and a second driving voltage signal may be loaded to each of the second strip-shaped electrodes EP02 in the even-numbered driving unit DE. The second driving voltage signal may be loaded to each of the first strip-shaped electrodes EP01 in the odd-numbered driving unit DE, and the first driving voltage signal may be loaded to each of the second strip-shaped electrodes EP02 in the odd-numbered driving unit DE. In this way, the driving signals loaded to two adjacent driving units DE are kept inverted. Further, the first driving voltage signal and the second driving voltage signal may be alternating voltage signals or pulsed voltage signals.

In another embodiment of the present disclosure, the controller CTR, when driving the tactile feedback substrate PNL, may also selectively drive part of the driving units DE. As an example, the working driving units may be each of the even-numbered driving units DE or each of the odd-numbered driving units DE. In other words, the controller CTR, when driving the tactile feedback substrate PNL, may only drive the even-numbered driving unit DE or the odd-numbered driving unit DE. When driving the working driving unit, the first driving voltage signal may be loaded to the first strip-shaped electrode EP01 of the working driving unit, and the second driving voltage signal may be loaded to the second strip-shaped electrode EP02 of the working driving unit.

By way of further example, in an embodiment of the present disclosure, in the step S120, the first driving voltage signal may be loaded to each of the first strip-shaped electrodes EP01 in the even-numbered driving unit DE, the second driving voltage signal may be loaded to each of the second strip-shaped electrodes EP02 in the even-numbered driving unit DE. Alternatively, in the step S120, the second driving voltage signal may be loaded to each of the first strip-shaped electrodes EP01 in the odd-numbered driving unit DE, and the first driving voltage signal may be loaded to each of the second strip-shaped electrodes EP02 in the odd-numbered driving unit DE.

Figure 12:
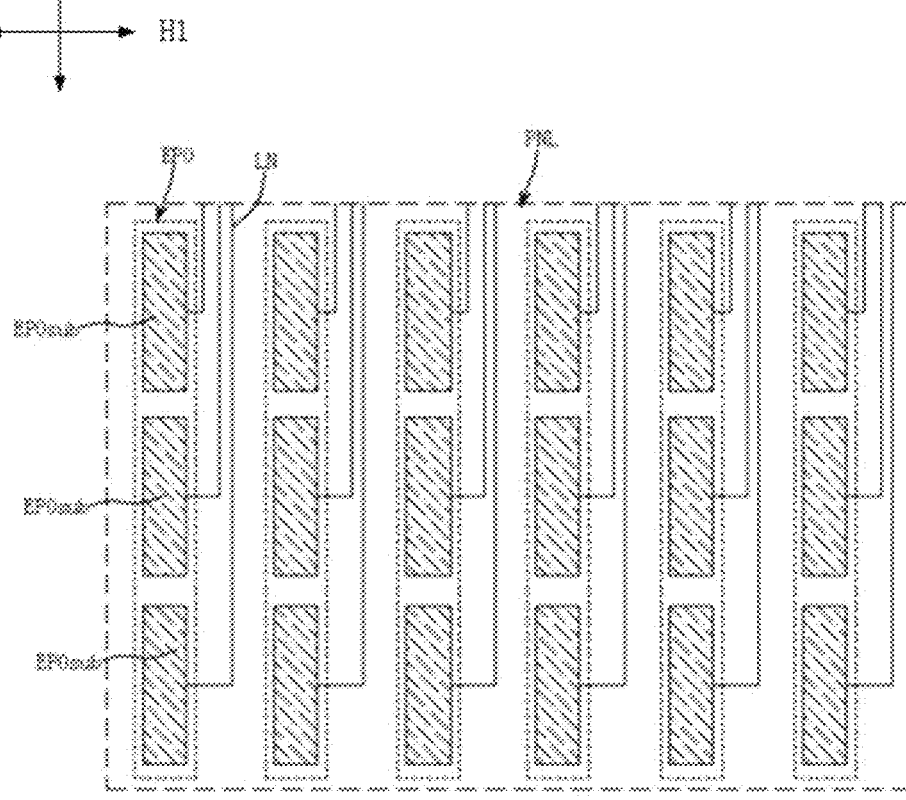
FIG. 12 is a schematic diagram of a local structure of an arrangement of electrode pairs in an embodiment of the present disclosure.

In some embodiments, referring to FIG. 12, the strip-shaped electrode EP0 (e.g., the first strip-shaped electrode EP01 and/or the second strip-shaped electrode EP02) may be divided into a plurality of strip-shaped sub-electrodes EP0sub, and each of the strip-shaped sub-electrodes EP0sub is electrically connected to the controller CTR independently. For example, referring to FIG. 12, the respective strip-shaped sub-electrodes EP0sub are electrically connected to respective binding pads (not shown in the figure) via the driving wire LN.

Under normal conditions, when driving the strip-shaped electrode EP0, the same voltage may be loaded to each strip-shaped sub-electrode EP0sub of the strip-shaped electrode EP0 to make the strip-shaped sub-electrodes EP0sub simulate the strip-shaped electrode EP0. When a defect is found to be present in the piezoelectric layer PE, for example, when there is a short-circuiting defect in the piezoelectric layer PE at a particular position, the strip-shaped sub-electrode at that particular position may be shielded by the controller CTR; the driver does not load the driving signal to the strip-shaped sub-electrode at the defect when driving the tactile feedback substrate PNL. Specifically, when a defect exists in the piezoelectric layer PE covered by any of the strip-shaped sub-electrodes EP0sub, the strip-shaped sub-electrode EP0sub may be shielded by the CRT, and the controller CTR sends the driving signal without sending a signal to that strip-shaped sub-electrode EP0sub.

In some embodiments, the base substrate BP may be a base substrate of an inorganic material or a base substrate of an organic material. By way of example, in an embodiment of the present disclosure, the material of the base substrate may be a glass material such as soda-lime glass, quartz glass, and sapphire glass. In another embodiment of the present disclosure, the material of the base substrate may be polymethyl methacrylate (PMMA), polyvinyl alcohol (PVA), polyvinyl phenol (PVP), polyether sulfone (PES), polyimide, polyamide, polyacetal, polycarbonate (PC), polyethylene terephthalate (PET), polyethylene naphthalate (PEN), or combinations thereof.

Of course, in other embodiments of the present disclosure, the base substrate may also be a substrate with a specific function, for example, the base substrate may be a display panel, a touch panel, a touch display panel, a colored film substrate, a glass cover, and the like.

In some embodiments of the present disclosure, the material of the piezoelectric layer PE may be an inorganic piezoelectric material, an organic piezoelectric material, or a composite piezoelectric material. In an embodiment of the present disclosure, the material of the piezoelectric layer PE may include one of lead zirconate titanate piezoelectric ceramic (PZT), polyvinylidene fluoride (PVDF), zinc oxide (ZnO), and the like.

Optionally, the material of the first electrode layer EP1 and the material of the second electrode layer EP2 may be selected from conductive materials, for example, a metal, a conductive metal oxide, a conductive polymer, a conductive composite material, or a combination thereof may be selected. For example, the metal may be selected from platinum, gold, silver, aluminum, chromium, nickel, copper, molybdenum, titanium, magnesium, calcium, barium, sodium, palladium, iron, manganese, or combinations thereof. For example, the conductive metal oxide may be selected from indium oxide, tin oxide, indium tin oxide, fluorine-doped tin oxide, aluminum-doped zinc oxide, gallium-doped zinc oxide, or combinations thereof. For example, the conductive polymer may be selected from polyaniline, polypyrrole, polythiophene, polyacetylene, poly(3,4-ethylenedioxythiophene)/polystyrene sulfonic acid (PEDOT/PSS), or combinations thereof. The conductive polymer may be supplemented with dopants such as an acid (e.g., hydrochloric acid, sulphuric acid, sulfonic acid, etc.), a Lewis acid (e.g., phosphorus fluoride, arsenic fluoride, ferric chloride, etc.), halogens, and alkali metals. For example, the conductive composite material may be selected from a conductive composite material dispersed with carbon black, graphite powder, metal microparticles, and the like. In an embodiment of the present disclosure, the material of the first electrode layer EP1 and the material of the second electrode layer EP2 may include one of molybdenum (Mo), platinum (Pt) or indium tin oxide (ITO).

Optionally, the controller CTR may be bound and connected to the tactile feedback substrate PNL. In an embodiment of the present disclosure, the controller CTR may include a circuit board bound to the tactile feedback substrate PNL and a driving chip disposed on the circuit board. The driving chip drives the electrode pairs EE through the circuit board.

The embodiments of the present disclosure also provide an electronic device that includes any tactile feedback apparatus described above in the tactile feedback apparatus embodiments. The electronic device may be an in-vehicle display, a mobile phone screen, or another type of electronic device. Since the electronic device has any tactile feedback apparatus described in the above-mentioned tactile feedback apparatus embodiments, the electronic device has the same beneficial effect and the present disclosure will not repeat herein.

After considering the specification and practicing the present disclosure herein, those skilled in the art will easily come up with other embodiments of the present disclosure. The purpose of the present disclosure is to cover any variations, uses, or adaptations of the present disclosure, and these variations, uses, or adaptations follow the general principles of the present disclosure and include common knowledge or commonly used technical means in the technical field that are not disclosed in the present disclosure. The specification and embodiments are only considered exemplary.

What is claimed is:

1. A tactile feedback apparatus, comprising a tactile feedback substrate and a controller, wherein the tactile feedback substrate comprises a base substrate, a first electrode layer, a piezoelectric layer, and a second electrode layer that are laminated sequentially; wherein a plurality of electrode pairs arranged sequentially along a row direction are formed in a portion where the first electrode layer and the second electrode layer overlap with each other; and each of the electrode pairs extends along a column direction;

the controller is configured to be capable of determining one driving mode from a plurality of driving modes as a target driving mode; in any of the driving modes, the electrode pairs are combined to form a plurality of driving units adjoined in sequence along the row direction, each of the driving units comprises a same number of electrode pairs adjoined in sequence; the number of the electrode pairs in the driving unit is different in different driving modes;

wherein the first electrode layer comprises a plurality of first strip-shaped electrodes arranged sequentially along the row direction;

the second electrode layer comprises a plurality of second strip-shaped electrodes arranged sequentially along the row direction and in one-to-one correspondence with the first strip-shaped electrodes;

each of the first strip-shaped electrodes and a corresponding second strip-shaped electrode overlap with each other; and each of the first strip-shaped electrodes and the corresponding second strip-shaped electrode form each of the electrode pairs; and the controller is further configured to load a first driving voltage signal to each of the first strip-shaped electrodes in the even-numbered driving unit, and load a second driving voltage signal to each of the second strip-shaped electrodes in the even-numbered driving unit; and the controller is further configured to load the second driving voltage signal to each of the first strip-shaped electrodes in the odd-numbered driving unit, and load the first driving voltage signal to each of the second strip-shaped electrodes in the odd-numbered driving unit.

2. The tactile feedback apparatus according to claim 1, wherein an orthographic projection of each of the first strip-shaped electrodes on the piezoelectric layer coincides with an orthographic projection of the corresponding second strip-shaped electrode on the piezoelectric layer.

3. The tactile feedback apparatus according to claim 1, wherein each of the first strip-shaped electrodes comprises a plurality of strip-shaped sub-electrodes arranged sequentially along the column direction, and each of the strip-shaped sub-electrodes is electrically connected to the controller independently.

4. The tactile feedback apparatus according to claim 1, wherein each of the second strip-shaped electrodes comprises a plurality of strip-shaped sub-electrodes arranged sequentially along the column direction, and each of the strip-shaped sub-electrodes is electrically connected to the controller independently.

5. An electronic device, comprising a tactile feedback apparatus, wherein the tactile feedback apparatus comprises a tactile feedback substrate and a controller, wherein the tactile feedback substrate comprises a base substrate, a first electrode layer, a piezoelectric layer, and a second electrode layer that are laminated sequentially; wherein a plurality of electrode pairs arranged sequentially along a row direction are formed in a portion where the first electrode layer and the second electrode layer overlap with each other; and each of the electrode pairs extends along a column direction;

the controller is configured to be capable of determining one driving mode from a plurality of driving modes as a target driving mode; in any of the driving modes, the electrode pairs are combined to form a plurality of driving units adjoined in sequence along the row direction, each of the driving units comprises a same number of electrode pairs adjoined in sequence; the number of the electrode pairs in the driving unit is different in different driving modes;

wherein the first electrode layer comprises a plurality of first strip-shaped electrodes arranged sequentially along the row direction;

the second electrode layer comprises a plurality of second strip-shaped electrodes arranged sequentially along the row direction and in one-to-one correspondence with the first strip-shaped electrodes;

each of the first strip-shaped electrodes and a corresponding second strip-shaped electrode overlap with each other; and each of the first strip-shaped electrodes and the corresponding second strip-shaped electrode form each of the electrode pairs; and the controller is further configured to load a first driving voltage signal to each of the first strip-shaped electrodes in the even-numbered driving unit, and load a second driving voltage signal to each of the second strip-shaped electrodes in the even-numbered driving unit; and the controller is further configured to load the second driving voltage signal to each of the first strip-shaped electrodes in the odd-numbered driving unit, and load the first driving voltage signal to each of the second strip-shaped electrodes in the odd-numbered driving unit.

6. The electronic device according to claim 5, wherein an orthographic projection of each of the first strip-shaped electrodes on the piezoelectric layer coincides with an orthographic projection of the corresponding second strip-shaped electrode on the piezoelectric layer.

7. The electronic device according to claim 5, wherein the each of the first strip-shaped electrodes comprises a plurality of strip-shaped sub-electrodes arranged sequentially along the column direction, and each of the strip-shaped sub-electrodes is electrically connected to the controller independently.

8. The electronic device according to claim 5, wherein each of the second strip-shaped electrodes comprises a plurality of strip-shaped sub-electrodes arranged sequentially along the column direction, and each of the strip-shaped sub-electrodes is electrically connected to the controller independently.

9. A driving method of a tactile feedback apparatus, used for driving a tactile feedback apparatus, wherein the tactile feedback apparatus comprises a tactile feedback substrate and a controller, wherein the tactile feedback substrate comprises a base substrate, a first electrode layer, a piezoelectric layer, and a second electrode layer that are laminated sequentially; a plurality of electrode pairs arranged sequentially along a row direction are formed in a portion where the first electrode layer and the second electrode layer overlap with each other; and each of the electrode pairs extends along a column direction; and the driving method comprises:

determining one driving mode from a plurality of driving modes as a target driving mode; wherein in any of the driving modes, the electrode pairs are combined to form the plurality of driving units adjoined in sequence along the row direction, each of the driving units comprises a same number of electrode pairs adjoined in sequence; and the number of the electrode pairs in the driving unit is different in different driving modes; and driving one or more of the driving units of the target driving mode, wherein driving any of the driving units comprises loading a same driving signal to each of the electrode pairs of the driving unit;

wherein the first electrode layer comprises a plurality of first strip-shaped electrodes arranged sequentially along the row direction; the second electrode layer comprises a plurality of second strip-shaped electrodes arranged sequentially along the row direction and in one-to-one correspondence with the first strip-shaped electrodes; each of the first strip-shaped electrodes and a corresponding second strip-shaped electrode overlap with each other; and each of the first strip-shaped electrodes and the corresponding second strip-shaped electrode form each of the electrode pairs;

wherein the driving one or more of the driving units of the target driving mode comprises:

loading a first driving voltage signal to each of the first strip-shaped electrodes in the even-numbered driving unit, and loading a second driving voltage signal to each of the second strip-shaped electrodes in the even-numbered driving unit; and loading the second driving voltage signal to each of the first strip-shaped electrodes in the odd-numbered driving unit, and loading the first driving voltage signal to each of the second strip-shaped electrodes in the odd-numbered driving unit.

* * * * *